United States Patent [19]

Krumm

[11] 4,304,622
[45] Dec. 8, 1981

[54] APPARATUS FOR PRODUCING THICK SLABS OF THERMOPLASTIC SYNTHETIC RESIN

[75] Inventor: Klemens Krumm, Neunkirchen-Seelscheid, Fed. Rep. of Germany

[73] Assignee: Reifenhäuser KG, Troisdorf, Fed. Rep. of Germany

[21] Appl. No.: 67,010

[22] Filed: Aug. 16, 1979

Related U.S. Application Data

[63] Continuation of Ser. No. 829,948, Sep. 1, 1977, abandoned.

[30] Foreign Application Priority Data

Sep. 2, 1976 [DE] Fed. Rep. of Germany ....... 2639512

[51] Int. Cl.³ .............................................. B29D 7/02
[52] U.S. Cl. .................................... 156/500; 156/243; 156/244.11; 156/244.12; 156/244.27; 425/335; 425/520
[58] Field of Search ...................... 156/244.11, 244.12, 156/244.22, 244.27, 243, 500; 264/75, 76; 425/94, 131.1, 133.5, 114, 141, 329, 335, 394, 516, 517

[56] References Cited

U.S. PATENT DOCUMENTS

| | | | |
|---|---|---|---|
| 2,358,176 | 9/1944 | MacDonald | 425/335 |
| 3,658,978 | 4/1972 | Ancker | 425/520 |
| 3,843,434 | 10/1974 | Heiks et al. | 425/141 |
| 3,844,870 | 10/1974 | Donoghue et al. | 156/244.11 |
| 3,890,078 | 6/1975 | Straumans | 425/141 |
| 3,930,774 | 1/1976 | Brand et al. | 425/141 |

*Primary Examiner*—Caleb Weston
*Attorney, Agent, or Firm*—Karl F. Ross

[57] ABSTRACT

An apparatus for producing thick slabs of thermoplastic synthetic-resin material comprises a pair of extruders each extruding a half-slab strand to a respective roller assembly, the roller assemblies having final rollers which form a consolidation nip between them in which the two half slabs are bonded together. Preferably the half slabs and the roller assemblies are mirror symmetrically constructed and the half slabs can be formed with longitudinal compartments which can be filled with a foamed synthetic-resin material.

9 Claims, 6 Drawing Figures

APPARATUS FOR PRODUCING THICK SLABS OF THERMOPLASTIC SYNTHETIC RESIN

This is a continuation of application Ser. No. 829,948, filed Sept. 1, 1977 now abandoned.

FIELD OF THE INVENTION

The present invention relates to an apparatus for producing relatively thick slabs of thermoplastic synthetic resin material which can be extruded and, more particularly, to the production of relatively thick slabs of thermoplastic synthetic resins which are free from stress and hence do not warp or buckle or otherwise change shape with time.

BACKGROUND OF THE INVENTION

It is known to produce relatively thick slabs of synthetic resin material and, especially, thermoplastic material, by extruding the material in a relatively thick and flat strand from a so-called broad nozzle attached to an extruder. The slab can then be calibrated between a pair of rolls of a roller assembly during which the slabs can be cooled or heated for solidification or tempering purposes.

When slabs are manufactured in this manner with a thickness of 60 millimeters or more, it has been found that they undergo, with time, deformation, bulging or warping which is of significant disadvantage, especially if the slabs are to be used as structural materials and to be reproducible in size, shape and physical properties.

OBJECT OF THE INVENTION

It is the object of the present invention to provide an apparatus for the production of thick and very thick slabs, i.e. slabs of a thickness of 60 mm or more, of a thermoplastic synthetic resin in such manner that the slabs are free or substantially free from non-relaxed or non-balanced internal stresses such that the finished slabs do not undergo shape change, bulging or warping.

SUMMARY OF THE INVENTION

This object and others which will become apparent hereinafter are attained, in accordance with the present invention, by providing two roller assemblies, each of which comprises at least one final roll, the final rolls forming a consolidation nip. A pair of extruders are juxtaposed with the roller assemblies and feed to the latter respective relatively flat strands, i.e. half slabs, of the thermoplastic synthetic resin material, the half slabs being consolidated in the consolidation nip and bonded together therein to form a continuous single slab structure.

Preferably, each of the assemblies comprises at least one pair of such rolls and all of the rolls have mutually parallel axes and can be driven individually or collectively.

Each roll assembly is provided with at least one extrusion press which feeds onto the surface of at least the final roll of the respective assembly the respective continuous strand so that, as the two strands enter the gap between the final rolls, they are pressed together. Advantageously, the two half-slab strands are of identical cross-section and dimensions, although this is not essential. Upon entering the consolidation gap, the residual heat, or externally applied heat, and the pressure between the two final rollers, brings about a material-merging connection of the two half-slab strands.

Each of the roller assemblies can comprise, as noted, a pair of rolls with the respective half-slab strand passing about each of the two rollers of the assembly and through a gap between them.

It is also possible, within the scope of the present invention, to provide each roll group or assembly with three rollers or more than three rollers, the respective half-slab strand passing on alternate sides of the rollers of the respective assembly.

In the system of the present invention, the individual rolls can be cooled or heated, depending upon whether a setting or tempering of the respective half-slab strand is desired. The rolls thus constitute cooling rolls or tempering rolls.

It has been found to be advantageous, regardless of whether the rolls are heated or cooled, to provide a heating of the surfaces of the half-slab strands to be bonded together and, to this end, the apparatus of the present invention is provided at the inlet side to the consolidation gap with heating means for the two half-slab strands.

The heating means can be constituted by an infra-red heater, a contact heater or an ultra-sonic heater. Other types of heaters may also be used in accordance with the principles set forth above.

The invention is based upon the premise that the extruded half-slab strand which are displaced into the respective roller assemblies with the remanent extrusion heat can be readily welded together at their justaposed contact faces in the consolidation gap to form slabs whose stress distribution is adjustable and, indeed, fully compensated. In other words, the stresses of one slab strand can act directly opposite the stresses of the mirrors symmetrical half-slab strand so that there is complete compensation in the final slab of these internal stresses. In practice it has been found that warping, building and like deformation simply does not occur.

The symmetrical stress distribution over the slab cross-section is most pronounced when the slab strands are geometrically identical and are disposed in mirror symmetrical relationship.

To ensure a completely symmetrical stress distribution as is desired in accordance with the present invention, it has been found to be advantageous to make all of the rolls of the two roller groups with identical diameters and to dispose them symmetrically with respect to the consolidation gap.

If the roller assemblies are provided with heating and/or cooling means, the cooling and/or heating are preferably effected in the roller assemblies in a symmetrical manner with respect to a median plane through the aforementioned gap. The cooling and heating effects for the rollers should thus be adjustable to ensure completely symmetrical heating or cooling of the two strands. This can be accomplished by conventional control technology.

The identical cooling and/or tempering of the half-slab strands before they enter the consolidation gap has been found to greatly ensure the uniformity of the stress distribution within the finished slab.

To further ensure precisely identical state parameters for the two half-slab strands, it has been found to be advantageous to ensure that each strand lies flat against the rollers of the respective group as soon as the strand leaves the respective extruder. The cooling and/or heating effects may then be controlled by regulating the speed of rotation of the rolls.

To ensure flat contact of each strand against the periphery of the respective rollers, it has been found to be advantageous to provide those rollers which are not juxtaposed with other rollers to act as counter-rollers, with additional counter-rollers and/or fixing devices to ensure contact of the strand with the roller surface. The fixing devices can include pressing rollers or vacuum fixing devices, i.e. an evacuated periphery of the roller or drum against which the strand is to lie flat.

The individual half-slab strands can be formed homogeneously from the point of view of the material constituting same, or as laminates or multi-layer structures.

In the case in which laminated half-slab strands are to be fabricated in accordance with the present invention, additional extrusion presses can be provided to form the successively applied layers of the half-slab strand. Thus, when three rolls are provided per roller assembly, the extruder mentioned previously can apply its half-slab strand to the nip between the outermost pair of rollers from the consolidation gap. A subsequent layer can be applied by an extruder in the nip between the two innermost rollers of the assembly. In other words, the layers are applied uniformly (with respect to the two half-slab strands) by respective extruders from roller to roller in the nips between them. Alternatively, the laminated strand can emerge from a single broad-slit extrusion head.

It has also been found to be advantageous, according to a further feature of the invention to introduce a reinforcing inlay between the half-slab strands in the consolidation gap. The reinforcing inlay can be a reinforcing mesh or web of any suitable material, i.e. glass fibers or metal wire. Naturally, layers of longitudinally extending mutually parallel reinforcing rods or bars or bands can be applied similarly.

In the region of the consolidation gap, moreover, a further strand of thermoplastic synthetic resin can be introduced between the two half-slab strands to form an intermediate or bonding layer.

In yet another embodiment of the invention, each of the half-slab strands is formed with a longitudinal concavity or recess open toward the other strand at the gap and defining with the concavity of the opposing strand a respective longitudinally extending compartment. According to this aspect of the invention, a filler is introduced into the longitudinally extending chamber. The filler can be a synthetic resin scrap which is comminuted or foamable synthetic resin which can foam while the resin is enclosed in the chamber.

An advantage of the invention is that it is capable of producing very thick slabs of thermoplastic synthetic resin materials with practically no internal stresses or internal stresses so balanced or equalized after bonding of the half-slab strand together, that the finished slab is free from any tendency to bulge or warp.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
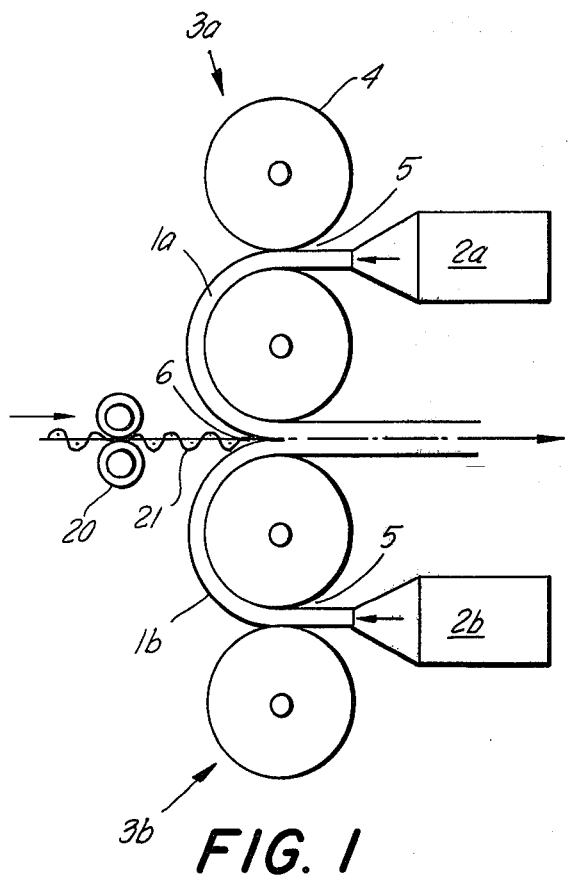
FIG. 1 is a side-elevational view in diagrammatic form illustrating an apparatus in which each of the roller assemblies comprises a pair of rolls.

In the drawing, identical reference numerals are used to identify identically functioning elements.

The apparatus shown in the drawing for producing thick slabs 1 of thermoplastic synthetic-resin material comprises basically a pair of extrusion presses 2a, 2b and respective roller assemblies 3a and 3b (FIG. 1).

In FIG. 1, each of the roller assemblies comprises a pair of rolls 4 which have axes lying in a vertical plane perpendicular to the plane of the finished slab 1. All of the rolls 4 are of the same diameter. Two of the rolls 4 define a consolidation gap 6 between them while an inlet gap 5 is provided between the rolls 4 of each pair.

The extruders 2a and 2b extrude respective hot and plastically deformable strands of thermoplastic material, i.e. so-called half-slab strands 1a and 1b, into the respective gaps 5, the strands passing flat around the periphery of the inner drums 4 and merging at the gap 6 to consolidate together with material exchange by diffusion or contact so that a homogeneous bond is formed between the half-slab strands and the resulting slab 1 is substantially homogeneous throughout.

Figure 2:
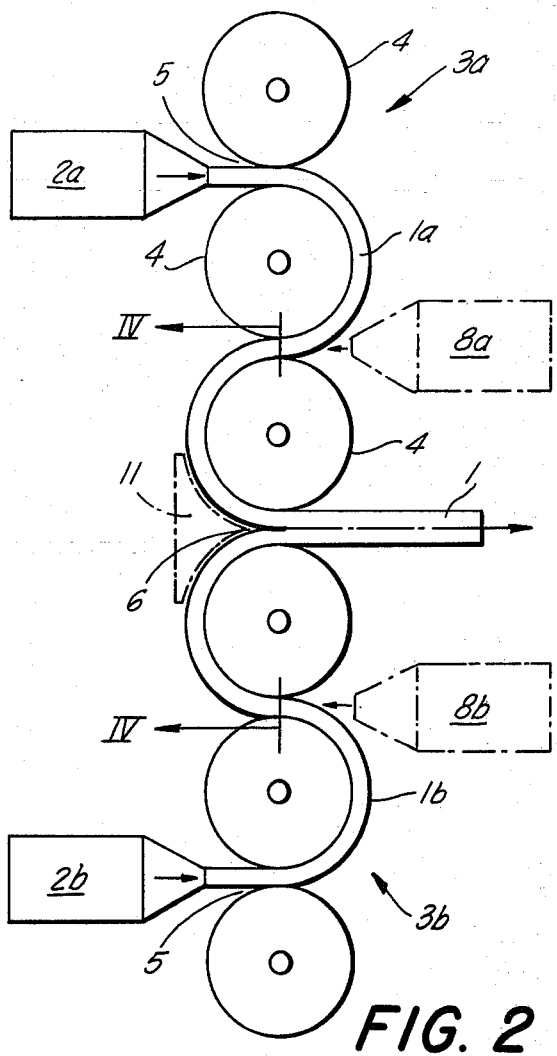
FIG. 2 is a view similar to FIG. 1 in which each assembly comprises three rolls.
Figure 4:
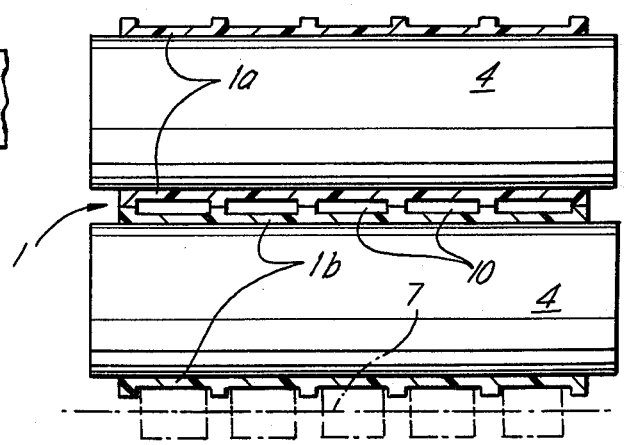
FIG. 4 is a cross-sectional view of the embodiment of FIG. 2 taken along line IV—IV of this latter figure.

In FIGS. 2 and 4, there is shown another embodiment of the invention in which each roller assembly 3a, 3b comprises four stacked and co-planar rolls 4 with the respective strands 1a and 1b being extruded into the gaps 5 between the outermost pair of rolls 4 of each assembly. As a result, the strands 1a and 1b first pass along one side of the central roller of each assembly and then along the opposite side of the terminal roller forming the consolidation gap 6. Here again, all of the rolls 4 are of identical diameter and are disposed mirror symmetrically with respect to the median plane of the slab 1.

While the heating and cooling means cannot be seen in the drawing, it should be clear that the rolls 4 of the roller assembly 3a and 3b are heatable and/or coolable so that the cooling and heating effects upon the respective strands are completely symmetrical and adjustable. Thus the two strands entering the gap 6 are completely identical with respect to material state. Naturally, the strands should be geometrically identical and disposed mirror symmetrically with flat surfaces in contact with the peripheries of the drums about which the strands pass.

Figure 3:
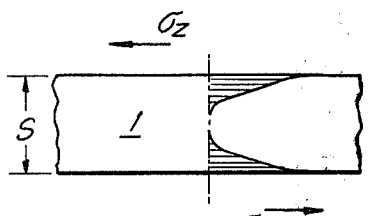
FIG. 3 is a diagrammatic cross-sectional view through a slab produced from synthetic resin according to the invention showing the stress distribution therein.

When internal stress is found in each individual strand, as shown in FIG. 3, these stresses, represented at $\sigma_Z$ and $\sigma_D$, balance over the thickness S of the finished slab.

Where necessary, fixing devices, e.g. pressing rollers 7 as shown in FIG. 4 can be provided to hold the strand firmly against each roller about which the strand passes. Naturally, the rollers 4 can be provided with suction openings which likewise perform this function in a manner known per se.

In the systems shown in FIGS. 1-4, each strand is shown to be unitary, i.e. fully homogeneous. Naturally, however, the strands can be laminated, i.e. composed of a plurality of layers. In this case, additional extruders 8a and 8b can be provided to deposit further layers of thermoplastic material upon the strands 1a and 1b in the gaps between the innermost pair of rollers 4 of each roller assembly (see FIG. 2).

Figure 5:
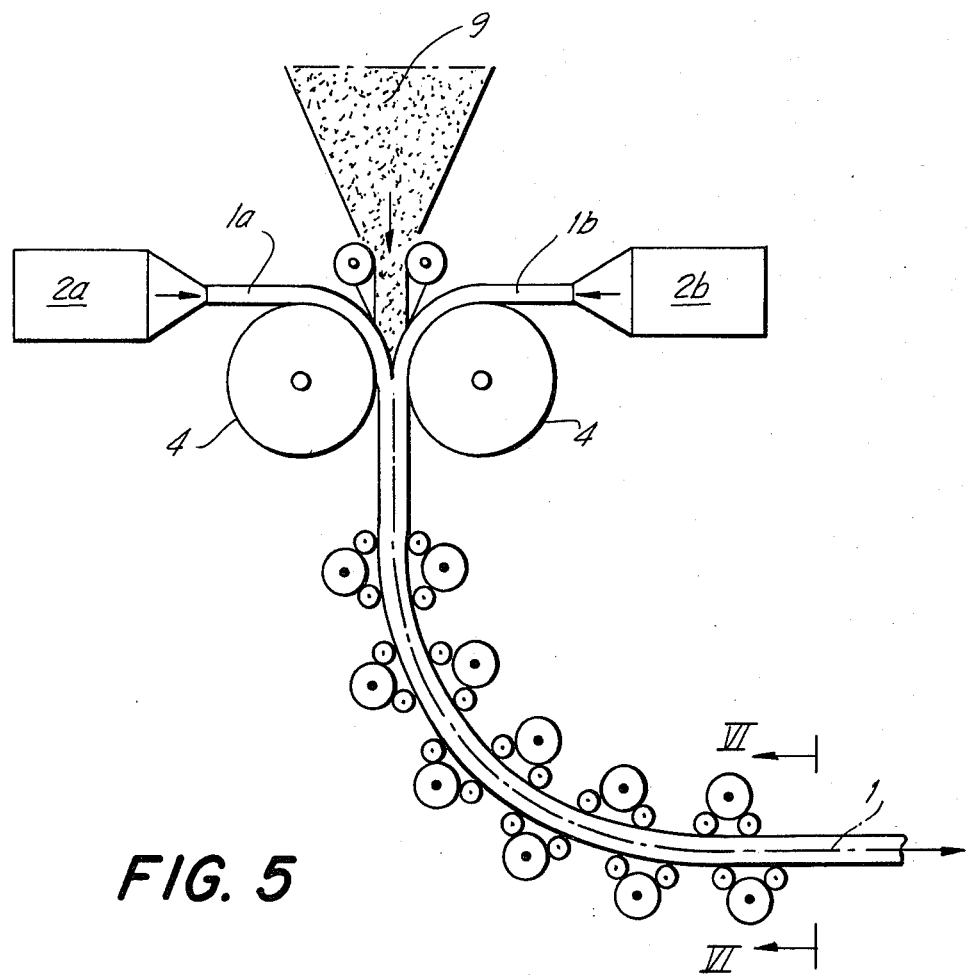
FIG. 5 illustrates another embodiment of the invention.
Figure 6:
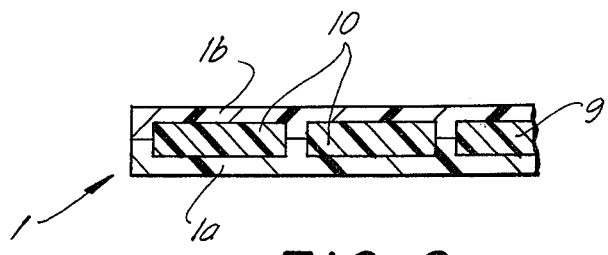
FIG. 6 is a cross-sectional view taken along the line VI—VI of FIG. 5.

In FIGS. 5 and 6 there is shown a system in which the half-slab strands 1a and 1b are formed with concavities which define longitudinal compartments 10 between them upon passage through the gap between the rollers 4. In this embodiment, a filler 9 is introduced into the compartments 10 continuously. The filler can be foamable or a foamed synthetic resin as has been illustrated in FIG. 6. In a similar manner, e.g. via the feed rollers 20 of FIG. 1, a reinforcing web can be introduced between the two half-slab strands so as to be consolidated and embedded therein.

At the gap 6, as has been shown in FIG. 2, a heating device 11, e.g. a radiant heater, can be provided to heat the surfaces of the two strands before they are consolidated together under the pressure of the innermost pair of rollers 4.

I claim:

1. An apparatus for producing thick slabs of thermoplastic synthetic resin, comprising:
    a pair of extruders each having a broad-slot nozzle extruding a respective half-slab strand of said thermoplastic synthetic resin in a respective horizontal plane;
    respective roller assemblies each comprising a plurality of rollers and including two final rollers, all of said rollers lying in a common vertical plane, said final rollers of said assemblies defining an obstruction-free consolidation gap between them of the thickness of the slabs to be produced with said strands passing along the periphery of at least said final rollers of said assemblies into said gap wherein said strands are consolidated into said slab which is discharged in a horizontal plane, each assembly including at least one additional roller apart from the respective final roller and defining a further gap, said nozzles being each positioned to extrude the respective strand into the further gap between two rollers of the respective assembly most removed from said consolidation gap, said rollers and said nozzles being positioned to cause each strand to extend around at least one roller over an arc of 180° before reaching said consolidation gap; and
    temperature control means for said additional rollers effective upon the respective strand, said temperature control means being effective symmetrically on opposite sides of said consolidation gap for the symmetrical cooling or heating of said strands, all of the rollers of said assemblies being of identical diameters and being disposed symmetrically with respect to said consolidation gap whereby each of said strands undergoes the same heating or cooling history as the other between the respective extruder and the gap.

2. The apparatus defined in claim 1 wherein each roller assembly comprises three rollers with the respective strand being extruded between the pair of rollers other than the respective final roller thereafter passing over at least two rollers of the respective assembly.

3. The apparatus defined in claim 1, further comprising means for retaining said strands along the peripheries of respective rollers of the respective assemblies.

4. The apparatus defined in claim 1 wherein said extruders are constructed and arranged to extrude laminated half-slab strands into the respective roller assemblies.

5. The apparatus defined in claim 1, further comprising secondary extruders for feeding further thermoplastic strands into each of said roller assemblies for lamination with said half-slab strands.

6. The apparatus defined in claim 1, further comprising heating means disposed at said gap for heating the surfaces of said strand to be bonded together in said consolidation gap.

7. The apparatus defined in claim 1 wherein said half-slab strands are each formed with at least one recess confronting the recess of the opposite strand in said consolidation gap and defining therewith a respective longitudinal compartment, said apparatus further comprising means for introducing a filler into said compartment and said consolidation gap.

8. The apparatus defined in claim 1, further comprising means for introducing a reinforcement between said strands into said consolidation gap.

9. The apparatus defined in claim 1, further comprising a plurality of pressing rollers for retaining said strands against said final rollers.

* * * * *